US012777351B2

(12) United States Patent
Barbu et al.

(10) Patent No.: US 12,777,351 B2

(45) Date of Patent: Oct. 27, 2026

(54) MECHANISM FOR DISRUPTIVE SIGNAL DISCOVERY

(71) Applicant: Nokia Technologies Oy, Espoo (FI)

(72) Inventors: Oana-Elena Barbu, Aalborg (DK); Ryan Keating, Naperville, IL (US); Benny Vejlgaard, Aalborg (DK); Johannes Harrebek, Aalborg (DK); Tao Tao, Shanghai (CN); Muhammad Ikram Ashraf, Espoo (FI)

(73) Assignee: Nokia Technologies Oy, Espoo (FI)

( * ) Notice: Subject to any disclaimer, the term of this patent is extended or adjusted under 35 U.S.C. 154(b) by 247 days.

(21) Appl. No.: 18/836,197

(22) PCT Filed: Mar. 9, 2022

(86) PCT No.: PCT/CN2022/079910

§ 371 (c)(1),
(2) Date: Aug. 6, 2024

(87) PCT Pub. No.: WO2023/168624

PCT Pub. Date: Sep. 14, 2023

(65) Prior Publication Data

US 2025/0203413 A1 Jun. 19, 2025

(51) Int. Cl.

| | |
|---|---|
| ***H04W 4/02*** | (2018.01) |
| ***H04W 4/029*** | (2018.01) |
| ***H04W 24/08*** | (2009.01) |

(52) U.S. Cl.

CPC ........... *H04W 24/08* (2013.01); *H04W 4/029* (2018.02)

(58) Field of Classification Search

CPC ........ H04W 24/08; H04W 4/029; H04W 4/02
See application file for complete search history.

(56) References Cited

U.S. PATENT DOCUMENTS

| | | | | |
|---|---|---|---|---|
| 2010/0073229 | A1* | 3/2010 | Pattabiraman .......... | G01S 19/46 342/357.64 |
| 2019/0081969 | A1* | 3/2019 | Phadke ............... | H04L 63/1416 |

(Continued)

FOREIGN PATENT DOCUMENTS

| | | | |
|---|---|---|---|
| CN | 112601173 | A | 4/2021 |
| WO | 2021/198983 | A1 | 10/2021 |
| WO | 2023/168631 | A1 | 9/2023 |

OTHER PUBLICATIONS

"3rd Generation Partnership Project; Technical Specification Group Radio Access Network; LTE Positioning Protocol (LPP) (Release 16)", 3GPP TS 37.355, V16.6.0, Sep. 2021, pp. 1-299.

(Continued)

*Primary Examiner* — Kenneth T Lam

(74) *Attorney, Agent, or Firm* — Lippes Mathias LLP

(57) ABSTRACT

Mechanism on disruptive signal discovery is provided. According to embodiments of the present disclosure, if a first device determines that an anomaly behavior occurs at a second device, the first device transmits a measurement configuration to a set of third devices. The measurement configuration is used for detecting a source of the anomaly behavior. The set of third devices measure a disruptive signal based on the measurement configuration and transmit information relating to the second device to the first device. In this way, the source of the anomaly behavior can be detected and localized. Moreover, the integrity of the positioning session can be preserved.

20 Claims, 6 Drawing Sheets

(56) References Cited

U.S. PATENT DOCUMENTS

| | | | | |
|---|---|---|---|---|
| 2019/0380043 | A1 | 12/2019 | Hassan et al. | |
| 2020/0059800 | A1* | 2/2020 | Menon | H04B 17/345 |
| 2020/0396711 | A1 | 12/2020 | He et al. | |
| 2021/0099885 | A1 | 4/2021 | Tsai et al. | |
| 2021/0185535 | A1 | 6/2021 | Agarwal et al. | |
| 2021/0185637 | A1 | 6/2021 | Agarwal et al. | |
| 2021/0333410 | A1* | 10/2021 | Gum | G01S 19/21 |
| 2021/0351973 | A1 | 11/2021 | Ford et al. | |
| 2024/0073854 | A1* | 2/2024 | Rao | G01S 5/0036 |
| 2026/0140498 | A1* | 5/2026 | Raman | G05B 23/024 |

OTHER PUBLICATIONS

"3rd Generation Partnership Project; Technical Specification Group Radio Access Network; NG-RAN; NR Positioning Protocol A (NRPPa) (Release 16)", 3GPP TS 38.455, V16.5.0, Oct. 2021, pp. 1-152.

"LS on Positioning Reference Units (PRUs) for enhancing positioning performance", 3GPP TSG RAN WG2#115-e, R2-2106920, RAN1, Aug. 9-27, 2021, 2 pages.

"New SID on NR Positioning Enhancements", 3GPP TSG RAN Meeting #86, RP-193237, Agenda: 9.1.1, Qualcomm Incorporated, Dec. 9-12, 2019, 4 pages.

"Moderator's summary for discussion [RAN93e-R18Prep-10] Expanded and improved Positioning", 3GPP TSG RAN#93e, RP-211660, Agenda: 9.0.1, Intel, Sep. 13-17, 2021, pp. 1-67.

Cheng et al., "An Algorithm for Jammer Localization in Wireless Sensor Networks", IEEE 26th International Conference on Advanced Information Networking and Applications, Mar. 26-29, 2012, 8 pages.

Axell, "GNSS interference detection", FOI, FOI-R—3839-SE, Feb. 2014, 33 pages.

"Msc-generator", Sourceforge, Retrieved on Jun. 11, 2024, Webpage available at :https://sourceforge.net/projects/msc-generator/.

Li et al., "Secure 5G Positioning with Truth Discovery, Attack Detection and Tracing", IEEE Internet of Things Journal, vol. 09, No. 22, Nov. 15, 2022, pp. 22220-22229.

Chen et al., "Detecting and Localizing Identity-Based Attacks in Wireless and Sensor Networks", IEEE Transactions on Vehicular Technology, vol. 59, No. 05, Jun. 2010, pp. 2418-2434.

"IEEE 802.11", Wikipedia, Retrieved on Jun. 11, 2024, Webpage available at : https://en.wikipedia.org/wiki/IEEE_802.11.

International Search Report and Written Opinion received for corresponding Patent Cooperation Treaty Application No. PCT/CN2022/079910, dated May 30, 2022, 9 pages.

* cited by examiner

MECHANISM FOR DISRUPTIVE SIGNAL DISCOVERY

RELATED APPLICATION

This application claims priority to PCT Patent Application No. PCT/CN2022/079910, filed 9 Mar. 2022, which is incorporated herein by reference in its entirety.

FIELD

Embodiments of the present disclosure generally relate to communication techniques, and more particularly, to methods, devices and computer readable medium for disruptive signal discovery.

BACKGROUND

Positioning is an important enabler for various verticals and use cases that the fifth generation (5G) system aims to support. By obtaining knowledge relating to approximate/precise position of devices, applications such as location-based services, autonomous driving, and industrial internet of thing (IoT) can be fulfilled by 5G system. Although accurate positioning typically could be fulfilled by global navigation satellite system (GNSS) techniques such as global positioning system (GPS), they may not be able to provide positioning with sufficient accuracy for indoor scenarios such as factory automation or warehouse management. Thus, radio access technology (RAT)-dependent positioning methods based on downlink/uplink signals should to be studied.

SUMMARY

Generally, embodiments of the present disclosure relate to a method for disruptive signal discovery and corresponding devices.

In a first aspect, there is provided a first device. The first device comprises at least one processor; and at least one memory including computer program codes; the at least one memory and the computer program codes are configured to, with the at least one processor, cause the first device to: determine whether an anomaly behavior occurs at a second device; in accordance with a determination that the anomaly behavior is detected at the second device, transmit, to a set of third devices, a measurement configuration for detecting a source of the anomaly behavior; and receive, from the set of third devices, information relating to the source.

In a second aspect, there is provided a third device. The third device comprises at least one processor; and at least one memory including computer program codes; the at least one memory and the computer program codes are configured to, with the at least one processor, cause the third device to: receive, from a first device, a measurement configuration for detecting a source causing an anomaly behavior at a second device; perform a measurement on a disruptive signal from the source based on the measurement configuration; and transmit, to the first device, information relating to the source.

In a third aspect, there is provided a method. The method comprises determining, at a first device, whether an anomaly behavior occurs at a second device; in accordance with a determination that the anomaly behavior is detected at the second device, transmitting, to a set of third devices, a measurement configuration for detecting a source of the anomaly behavior; and receiving, from the set of third devices, information relating to the source.

In a fourth aspect, there is provided a method. The method comprises receiving, at a third device and from a first device, a measurement configuration for detecting a source causing an anomaly behavior at a second device; performing a measurement on a disruptive signal from the source based on the measurement configuration; and transmitting, to the first device, information relating to the source.

In a fifth aspect, there is provided a computer readable medium comprising program instructions for causing an apparatus to perform at least the method according to the above third or fourth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
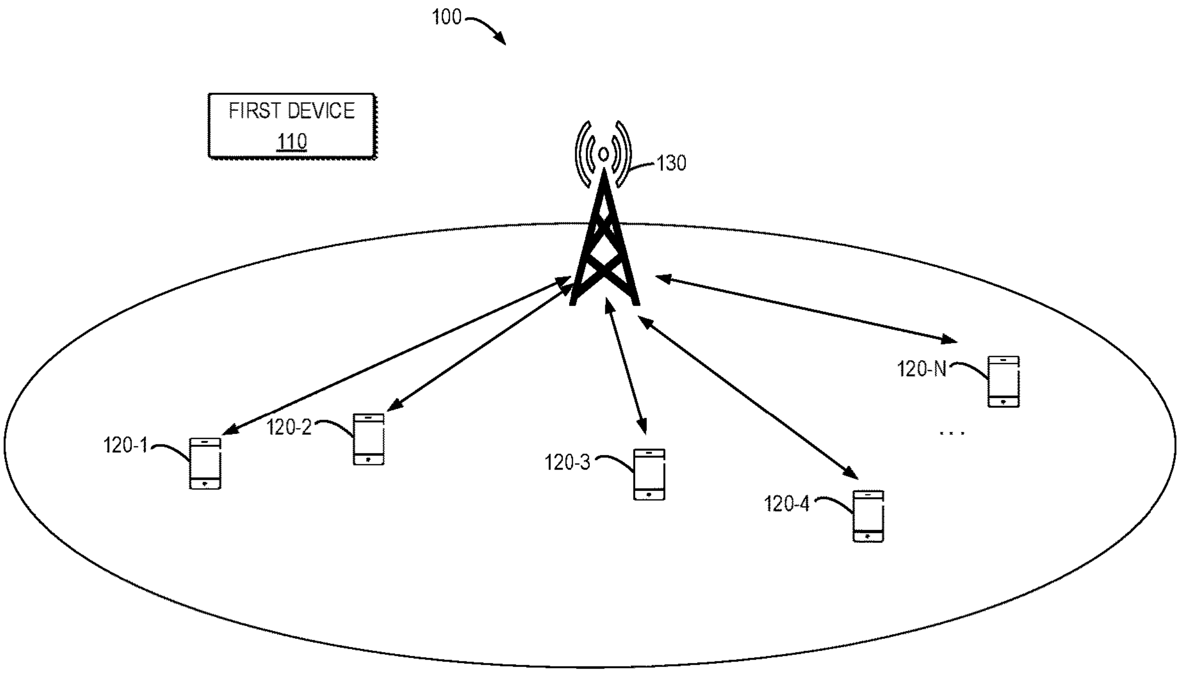
FIG. 1 illustrates a schematic diagram of a communication system according to according to embodiments of the present disclosure.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and
(b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory (ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT), New Radio (NR) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

As mentioned above, radio access technology (RAT)-dependent positioning methods based on downlink/uplink signals should to be studied. 5G NR positioning integrity concerns have been raised and deserves investigation. Integrity represents information relating to "how much and/or how long the positioning estimation results can be trusted". Note that the integrity concept is already an important element for conventional positioning methods based on GNSS and it is also an important system design aspect for applications that rely on accurate positioning (e.g. autonomous driving).

One of the main threats of NR positioning integrity is an attack (e.g., a physical layer attack, a disruptive attack, a malicious attack, and/or the like). An attack appears when another device disturbs the positioning session totally or partially, causing a severe degradation of the localization accuracy. In an attack, the target location is either faked or the network is prevented from acquiring it altogether. Such attacks are frequent in GNSS positioning and are a real threat for NR positioning integrity since they ultimately enable an illegal activity to be performed incognito. For the above reasons, an integrity framework that allows for the identification, detection and ultimately the eradication of an attack should be defined.

Positioning integrity is threatened by fraudulent or malicious devices that emit disruptive or malicious signals intended to disturb an ongoing communication and/or positioning session. The malicious signal is sent with different transmission patterns and aims at faking the appearance of the wireless channel/signal. In positioning, an attack attempts at blocking and/or faking positioning signals so that the network is prevented from acquiring a reliable target location, ultimately compromising the localization integrity. Therefore, the positioning integrity is compromised when a fraudulent device either: impersonates one or more transmitters, and by doing this implicitly fakes the location of the legitimate positioning transmitter, or purposely floods specific portions of the spectrum to degrade the signal to interference and noise ratio (SINR) of the positioning receiver. In either case, the end result is that the target location estimation has been compromised and cannot be trusted.

Although, there are some conventional countermeasures against some attacks, new solutions deserve investigating. For example, according to some conventional technologies, the problem can be avoided by using an opportunistic spectrum usage, i.e. by frequency hopping. This approach is not an option in NR positioning where positioning resources need to be pre-scheduled and allocated across multiple cells to mitigate interference. According to some other conventional technologies, the malicious device can be localized by assuming prior information about the malicious activity is available at designated sensor nodes. This is an unrealistic assumption for NR positioning, since the 5G network is not currently equipped with any protocols that enable the detection of the attack.

In order to solve at least part of the above problems and other potential problems, solutions on disruptive signal discovery are proposed. According to embodiments of the present disclosure, if a first device determines that an anomaly behavior occurs at a second device, the first device transmits a measurement configuration to a set of third devices. The measurement configuration is used for detecting a source of the anomaly behavior. The set of third devices measure a disruptive signal based on the measurement configuration and transmit information relating to the second device to the first device. In this way, the source of the anomaly behavior can be detected and localized. Moreover, the integrity of the positioning session can be preserved.

FIG. 1 illustrates a schematic diagram of a communication system in which embodiments of the present disclosure can be implemented. The communication system 100, which is a part of a communication network, comprises a first device 110. The first device 110 may be a core network device, for example, a location management function (LMF). The communication system also comprises a terminal device 120-1, a terminal device 120-2, a terminal device 120-3 . . . , a terminal device 120-N, which can be collectively referred to as "terminal device(s) 120." The communication system 100 further comprises a network device 130. It is to be understood that the number of devices shown in FIG. 1 is given for the purpose of illustration without suggesting any limitations. The communication system 100 may comprise any suitable number of devices and cells. In the communication system 100, the devices 120 can communicate data and control information to each other.

Communications in the communication system 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Divided Multiple Address (CDMA), Frequency Divided Multiple Address (FDMA), Time Divided Multiple Address (TDMA), Frequency Divided Duplexer (FDD), Time Divided Duplexer (TDD), Multiple-Input Multiple-Output (MIMO), Orthogonal Frequency Divided Multiple Access (OFDMA) and/or any other technologies currently known or to be developed in the future.

Figure 2:
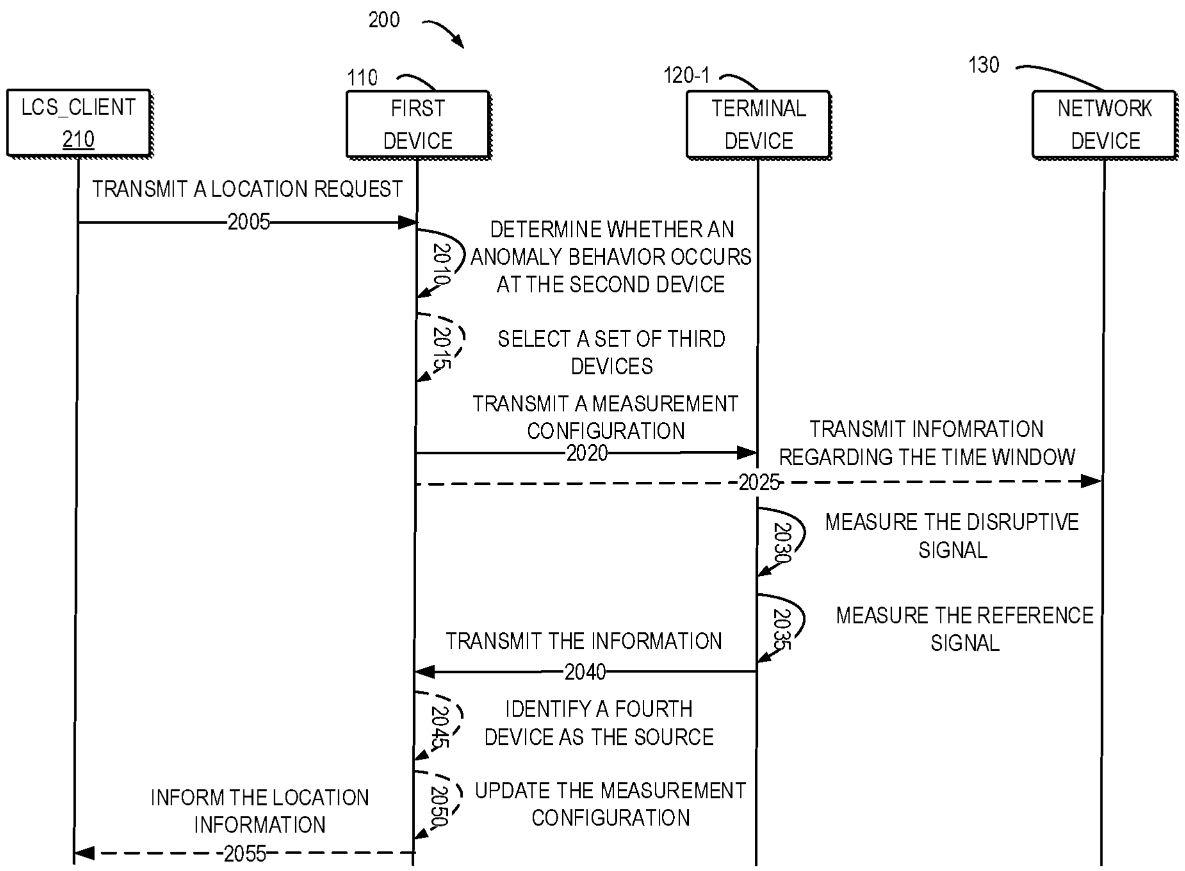
FIG. 2 illustrates a schematic diagram of interactions between devices according to according to embodiments of the present disclosure.

Example embodiments of the present disclosure will be described in detail below with reference to the accompanying drawings. Reference is now made to FIG. 2, which illustrates a signaling flow 200 according to example embodiments of the present disclosure. Only for the purpose of illustrations, the signaling flow 200 involves the first device 110, the terminal device 120-1, and the network device 130.

In some embodiments, a location service client (LCS) 210 may transmit 2005 a location request for a second device to the first device 110. The term "LCS client" used herein can refer to a software and/or hardware entity that interacts with a LCS Server for the purpose of obtaining location information for one or more Mobile Stations. In some embodiments, the second device may be a terminal device. For example, the second device can be any one of terminal devices 120. Only for the purpose of illustrations, the second device can refer to the terminal device 120-2 hereinafter. The LCS client 210 can request from the first device 110 in the public land mobile network (PLMN) location information for the second device within a specified set of parameters such as Quality of Service (QOS). The LCS Client 210 may reside in an entity (including the UE) within the PLMN or in an entity external to the PLMN.

The first device 110 determines 2010 whether an anomaly behavior occurs at the second device. The term "anomaly behavior" or "anomaly" used herein can refer to a behavior or pattern that does not conform to a regular behavior. The anomaly detection can be a step in data mining that identifies data points, events, and/or observations that deviate from a dataset's normal behavior.

In some embodiments, the first device 110 may compute a likelihood that the positioning integrity of the second device has been compromised. The first device 110 may collect data from the latest positioning sessions of the second device and information about traffic of the second device in the serving cell from the serving network device of the second device. In this case, the first device 110-1 may determine whether an anomaly behavior occurs at the second device based on information received from a serving network device of the second device. This information can be transmitted to the first device 110 upon a request from the first device 110. Alternatively, the information can be transmitted to the first device 110 periodically. In this case, in some embodiments, the first device 110 may perform the anomaly detection based on a target position accuracy or precision of the second device. For example, if the position accuracy of the second device is below the target position accuracy, the anomaly at the second device is detected. In other embodiments, the first device 110 may perform the anomaly detection based on channel state information (CSI) of the second device. For example, if the channel state information changes dramatically, the first device 110 may determine that the anomaly at the second device is detected. The term "channel state information (CSI)" used herein can refer to known channel properties of a communication link. This information describes how a signal propagates from the transmitter to the receiver and represents the combined effect of, for example, scattering, fading, and power decay with distance. Alternatively or in addition, the first device 110 may perform the anomaly detection based on a mobility profile of the second device. For example, the first device 110 may analyze a handover history and rate of the second device.

Alternatively, the first device 110 may determines whether an anomaly behavior occurs at the second device based on an indication regarding the anomaly behavior from the serving network device of the second device. In this case, the serving network device may perform the anomaly detection. For example, the serving network device may perform the anomaly detection based on the information about traffic of the second device. The serving network device may transmit the indication via backhaul (for example, via NR positioning protocol A (NRPPa) interface). In some embodiments, the indication may be a binary flag. For example, if the anomaly is detected, the binary flag may be "1."

In some embodiments, if the anomaly behavior for the second device is detected, the first device 110 can trigger a detection strategy with the purpose of localizing a source which causes the anomaly behavior. For example, the first device 110 may select 2015 a set of third device as positioning reference units (PRUs). The term "positioning reference unit (PRU)" used herein can refer to a device or network node with reliable location that can be activated on demand by the LMF to perform specific positioning operations, for example, measurement and/or transmission of specific positioning signals. The first device 110 may select the set of third devices based on a previous location of the second device and an approximate current location of the second device. In some embodiments, the previous location can be the latest reliable location of the second device. The first device 110 may select one or more devices that are close to the second device as the set of third devices. For example, the first device 110 may determine a distance between a device and the second device based on the previous location and the approximate current location of the second device. If the distance is below a threshold, said device can be selected as one of the set of third devices.

In some embodiments, the set of third devices may comprise one or more terminal devices. Alternatively, the set of third devices may comprise a network device, for example, the network device 130. Only for the purpose of illustrations, as shown in FIG. 2, the set of third devices may comprise the terminal device 120-1 and the network device 130.

The first device 110 transmits 2020 a measurement configuration for detecting the source of the anomaly behavior to the set of third devices. In this case, the first device 110 may be configured to measure a disruptive signal for a limited time, specific bandwidth portions, and carriers. The measurement configuration can be transmitted in a LTE positioning protocol (LPP) message. In some embodiments, the measurement configuration can be transmitted periodically. Alternatively or in addition, the measurement configuration can be transmitted on demand.

In some embodiments, the measurement configuration may comprise a spectrum portion to be measured by the set of third devices. For example, the measurement configuration may comprise a set of physical resource blocks (PRBs). The source (i.e., the fraudulent or malicious device) can transmit a set of disruptive signals on this set of PRBs. The term "disruptive signal" used herein can refer to a signal which is transmitted by a fraudulent device and may disturb the positioning of the target device.

Alternatively or in addition, the measurement configuration can comprise an attack strategy of the source. The term "attack strategy" used herein refers to how the disruption to or the hampering of a legitimate signal is performed. For example, in some embodiments, the measurement configuration may indicate that the source may be flooding the set of PRBs at once. Alternatively or in addition, the measurement configuration may indicate that subsets of the set of PRBs can be flooded in a random fashion. In some other embodiments, the attack strategy may include copying the legitimate signal and purposely delaying it (e.g., for a certain number of symbols, and/or the like) before transmitting the copied signal at full power.

In other embodiments, the measurement configuration may comprise a first configuration of a reference signal which is blocked by the disruptive signal from the source. In some embodiments, the reference signal may be a positioning reference signal (PRS). Alternatively or in addition, the reference signal may be a sounding reference signal (SRS). The set of third devices may subtract the useful signal from its received signal and isolate the disruptive signal based on the first configuration.

Alternatively or in addition, the measurement configuration may comprise a second configuration of a reference signal which is not blocked by the disruptive signal from the source. In other words, the measurement configuration may comprise a PRS or SRS configuration that the first device 110 considers to be clean.

In some embodiments, the measurement configuration may indicate a time window for detecting the disruptive signal from the source. For example, the time window can be aligned with a measurement gap of the set of third devices. Alternatively, the first device 110 may determine the time window based on the transmission pattern of the disruptive signal. The first device 110 may also transmit 2025 information regarding the time window to the serving network device, for example, the network device 130. In this case, the network device 130 may not schedule data for the set of third devices.

The measurement configuration may also indicate which metric(s) the set of third devices should report back. Alternatively or in addition, the measurement configuration may indicate which interface the set of third devices should use to report the metrics. For example, the measurement configuration may indicate that the set of third devices may report the metrics via LPP signaling. Alternatively, the measurement configuration may indicate that the metrics can be reported via radio resource control (RRC) signaling. In some other embodiments, the measurement configuration may indicate that the metrics can be reported via a sidelink (SL) relay.

The set of third devices can measure the disruptive signal based on the measurement configuration. For the purpose of illustrations, as shown in FIG. 2, the terminal device 120-1 measures 2030 the disruptive signal based on the measurement configuration. The terminal device 120-1 may measure the disruptive signal during the time window indicated in the measurement configuration. The terminal device 120-1 may subtract a reference signal from the disruptive signal based on the first configuration indicated in the measurement configuration. In some embodiments, the terminal device 120-1 may obtain a total received power of the disruptive signal per PRB. Alternatively or in addition, the terminal device 120-1 may obtain a signal to noise ratio (SNR) or a signal to interference and noise ratio (SINR) of the disruptive signal per PRB. In some other embodiments, the terminal device 120-1 may obtain a transmission pattern of the disruptive signal. In other word, the PRB usage over time can be obtained by the terminal device 120-1. The set of third devices may also perform directional measurements of the problematic spectrum. In this case, the set of third devices may report such measurements in the global coordinate system (i.e. by removing the orientation effects).

In some embodiments, the terminal device 120-1 may measure 2035 the reference signal which is considered to be clean. For example, the terminal device 120-1 may measure the PRS or SRS based on the second configuration indicated in the measurement configuration. The terminal device 120-1 may perform a positioning measurement on the reference signal based on the second configuration. For example, the terminal device 120-1 may determine the reference signal received power (RSRP) of the reference signal. Alternatively, time of arrival (TOA) of the reference signal may be obtained. The terminal device 120-1 may determine arrival of angle (AOA) of the reference signal.

The terminal device 120-1 transmits 2040 information relating to the source to the first device 110. For example, as mentioned above, the measurement configuration may indicate which metric(s) should be reported. In some embodiments, the information may indicate the total received power per PRB. Alternatively or in addition, the information may indicate the SNR or SINR the disruptive signal per PRB. The information may also indicate the transmission pattern of the disruptive signal. In this way, the source of the anomaly behavior can be detected and localized based on the information. Moreover, the integrity of the positioning session can be preserved.

As mentioned above, the terminal device 120-1 may measure the reference signal which is considered to be clean. In this case, the information transmitted by the terminal device 120-1 to the first device 110 may comprise the positioning measurement results of the reference signal. For example, the information may comprise one or any combination of: the RSRP of the reference signal, the TOA of the reference signal or the AOA of the reference signal. Other reference signals may also be selected for measurements. The first device 110 may consider the measurement results of the reference signal as a trusted measurement of the set of third devices. For example, if the clean reference signal is measured very accurately, the first device 110 may conclude that the PRU properties (e.g. measurement receiver, GNSS position reports, etc.) are precise enough and that it can also trust the rest of the measurements. In this way, the first device 110 ensures that the set of third devices can be trusted, thereby guaranteeing the integrity of the positioning session.

In some embodiments, the set of third devices (for example, the terminal device 120-1) may know its location. In this case, the terminal device 120-1 may perform the anomaly detection periodically. If the anomaly behavior occurs, the terminal device 120-1 can report such an event without an explicit trigger from the first device 110.

Figure 4A:
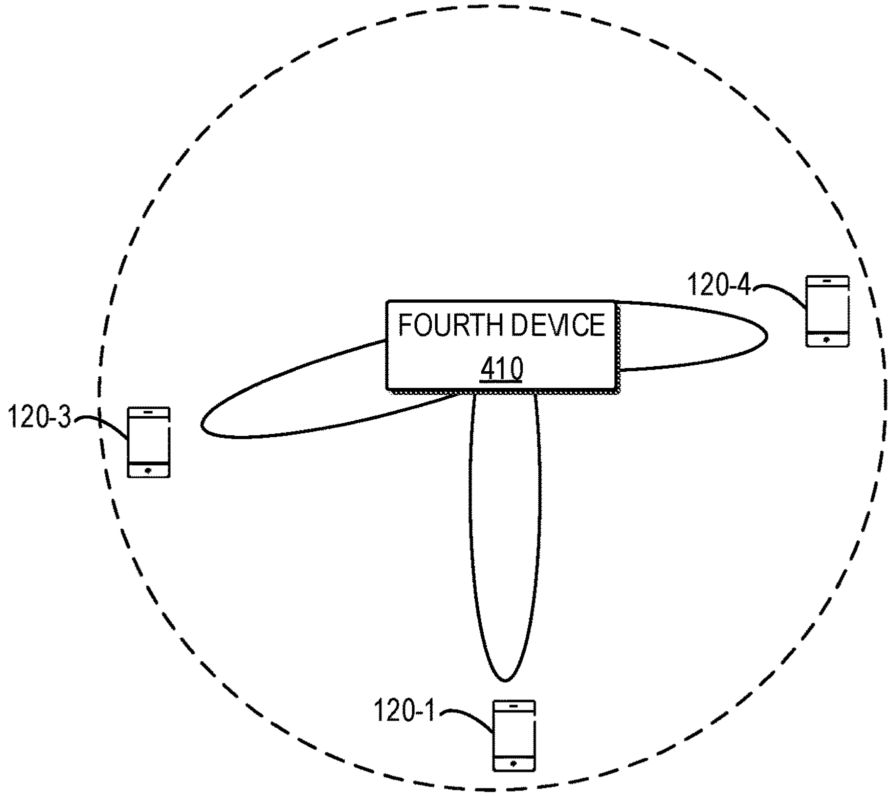
FIGS. 4A-4B illustrate schematic diagrams of estimating a fraudulent device according to according to embodiments of the present disclosure, respectively.
Figure 4B:
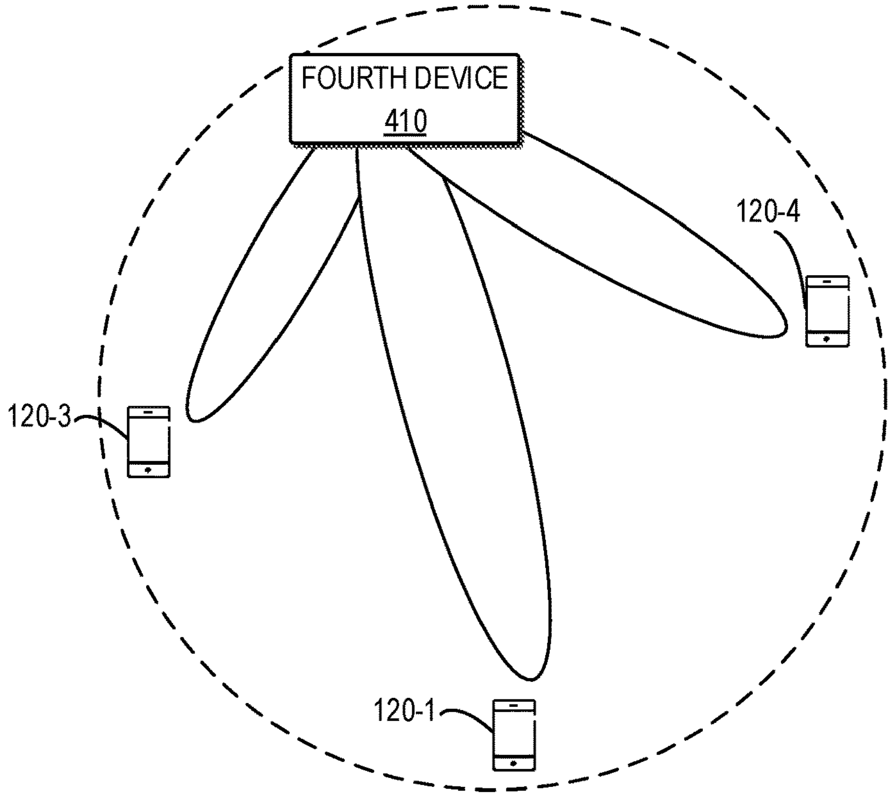

The first device 110 may identify 2045 a fourth device as the source based on the received information. The first device 110 may collect the information from the set of third devices and combine the collected information. The source/fourth device can be localized based on the collected information. In some embodiments, the first device 110 may determine weight values of the set of third devices based on the information. The first device 110 may combine weighted locations of the set of third devices. The location of the source/fourth device can be determined based on the combined weighted locations. The first device 110 may determine the location of the source based on a hierarchical approach. For example, the first device 110 may rank the trustworthiness of the set of third devises based on the measurement results concerning the clean reference signal. The first device 110 may combine the location of the set of third devices in a weighted manner. For example, the first device 110 may combine the location of the set of third devices based on weighted centroid localization. Alternatively, the location of the set of third devices may be combined based on double circle localization. For example, as shown in FIGS. 4A and 4B, the first device 110 may locate the fourth device 410 (i.e., the fraudulent or malicious device acting as the source) based on the information received from the terminal device 120-1, 120-3 and 120-4. As shown in FIG. 4A, the fourth device 410 may be closer to the center of the set of third devices. Alternatively, the fourth device 410 may be away from the center of the set of third devices.

Referring back to FIG. 2, the first device 110 may update 2050 the measurement configuration based on the information. For example, the set of PRBs needed to be measured by the set of third devices can be updated based on the information. Alternatively or in addition, the attack strategy of the source may be updated based on the information. In other embodiments, the first configuration of the reference signal may be updated based on the information.

The first device 110 may inform 2055 the fifth device (i.e., the LCS client 210) the location of the source. In some embodiments, the first device 110 may also inform the fifth device that the anomaly behavior is detected.

Figure 3:
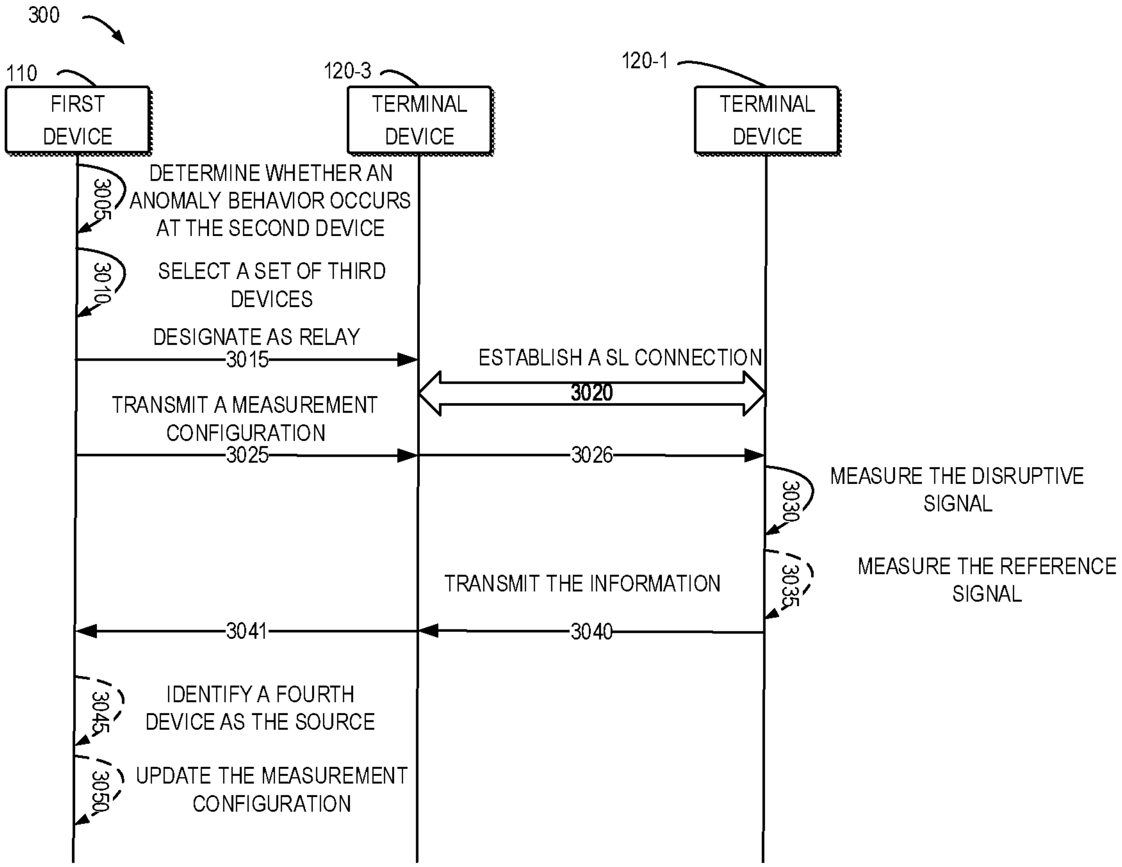
FIG. 3 illustrates a schematic diagram of interactions between devices according to according to embodiments of the present disclosure.

In some embodiments, the first device 110 may communicate with the set of third devices via a SL UE that acts as a safe relay between the first device 110 and the set of third devices. Reference is now made to FIG. 3, which illustrates a signaling flow 300 according to example embodiments of the present disclosure. Only for the purpose of illustrations, the signaling flow 300 involves the first device 110-1 and the second device 120.

The first device 110 determines 3005 whether an anomaly behavior occurs at the second device. In some embodiments, the first device 110 may analyze the likelihood that the positioning integrity of the second device has been compromised. The first device 110 may collect data from the latest positioning sessions of the second device and information about traffic of the second device in the serving cell from the serving network device of the second device. In this case, the first device 110-1 may determine whether an anomaly behavior occurs at the second device based on information received from a serving network device of the second device. This information can be transmitted to the first device 110 upon a request from the first device 110. Alternatively, the information can be transmitted to the first device 110 periodically. In this case, in some embodiments, the first device 110 may perform the anomaly detection based on a target position accuracy or precision of the second device. For example, if the position accuracy of the second device is below the target position accuracy, the anomaly at the second device is detected. In other embodiments, the first device 110 may perform the anomaly detection based on CSI of the second device. For example, if the channel state information changes dramatically, the first device 110 may determine that the anomaly at the second device is detected. Alternatively or in addition, the first device 110 may perform the anomaly detection based on a mobility profile of the second device. For example, the first device 110 may analyze a handover history and rate of the second device.

In some embodiments, if the anomaly behavior for the second device is detected, the first device 110 can trigger a detection strategy with the purpose of localizing a source which causes the anomaly behavior. For example, the first device 110 may select 3010 a set of third device as PRUs. The first device 110 may select the set of third devices based on a previous location of the second device and an approximate current location of the second device. In some embodiments, the previous location can be the latest reliable location of the second device. The first device 110 may select one or more devices that are close to the second device as the set of third devices. For example, the first device 110 may determine a distance between a device and the second device based on the previous location and the approximate current location of the second device. If the distance is below a threshold, said device can be selected as one of the set of third devices.

In some embodiments, the set of third devices may comprise one or more terminal devices. Alternatively, the set of third devices may comprise a network device, for example, the network device 130. Only for the purpose of illustrations, as shown in FIG. 3, the set of third devices may comprise the terminal device 120-1 and the network device 130.

The first device 110 may designate 3015 a terminal device (for example, the terminal device 120-3) as a relay. For example, if the disruptive signal level is too high in the UL bandwidth of the set of third devices and/or the serving network device cannot receive information, the first device 110 may determine a relay. In this case, the terminal device 120-3 may act as a uni-directional relay or a bi-directional relay of both measurement configuration and the measurement report in case both the DL and UL are severely affected. Alternatively, the terminal device 120-3 may act as a uni-directional relay or a bi-directional relay for the UL or DL.

The terminal device 120-3 and the terminal device 120-1 may establish 3020 a SL connection. The terminal device 120-3 may be in charge of selecting a safe SL link. For example, the terminal device 120-3 may determine a carrier, a bandwidth and/or other parameters to sustain the forwarding operations. In some embodiments, the terminal device 120-3 may perform a spectrum sensing operation on a spectrum portion. The terminal device 120-3 may select the safe SL link based on the spectrum sensing operation.

The first device 110 transmits 3025 a measurement configuration for detecting the source of the anomaly behavior to the terminal device 120-3. The terminal device 120-3 forwards 3026 the measurement configuration to the terminal device 120-1. In this case, the terminal device 120-1 may be configured to measure a disruptive signal for a limited time, specific bandwidth portions, and carriers. In some embodiments, the measurement configuration can be transmitted periodically. Alternatively or in addition, the measurement configuration can be transmitted on demand.

In some embodiments, the measurement configuration may comprise a spectrum portion to be measured by the set of third devices. For example, the measurement configuration may comprise a set of PRBs. The source (i.e., the fraudulent or malicious device) can transmit a set of disruptive signals on this set of PRBs. The term "disruptive signal" used herein can refer to a signal which is transmitted by fraudulent or malicious device and may disturb the positioning of the target device.

Alternatively or in addition, the measurement configuration can comprise information relating to an attack strategy of the source. For example, in some embodiments, the measurement configuration may indicate that the source may be flooding the set of PRBs at once. Alternatively or in addition, the measurement configuration may indicate that subsets of the set of PRBs can be flooded in a random fashion.

In other embodiments, the measurement configuration may comprise a first configuration of a reference signal which is blocked by the disruptive signal from the source. In some embodiments, the reference signal may be a positioning reference signal (PRS). Alternatively or in addition, the reference signal may be a sounding reference signal (SRS). The set of third devices may subtract the useful signal from its received signal and isolate the disruptive signal based on the first configuration.

Alternatively or in addition, the measurement configuration may comprise a second configuration of a reference signal which is not blocked by the disruptive signal from the source. In other words, the measurement configuration may comprise a PRS or SRS configuration that the first device 110 considers to be clean.

In some embodiments, the measurement configuration may indicate a time window for detecting the disruptive signal from the source. For example, the time window can be aligned with a measurement gap of the set of third devices. Alternatively, the first device 110 may determine the time window based on the transmission pattern of the disruptive signal.

The measurement configuration may also indicate which metric(s) the set of third devices should report back. Alternatively or in addition, the measurement configuration may indicate which interface the set of third devices should use to report the metrics. For example, the measurement configuration may indicate that the metrics can be reported via a sidelink (SL) relay.

The set of third devices can measure the disruptive signal based on the measurement configuration. For the purpose of illustrations, as shown in FIG. 3, the terminal device 120-1 measures 3030 the disruptive signal based on the measurement configuration. The terminal device 120-1 may measure the disruptive signal during the time window indicated in the measurement configuration. The terminal device 120-1 may subtract a reference signal from the disruptive signal based on the first configuration indicated in the measurement configuration. In some embodiments, the terminal device 120-1 may obtain a total received power of the disruptive signal per PRB. Alternatively or in addition, the terminal device 120-1 may obtain a signal to noise ratio (SNR) or a signal to interference and noise ratio (SINR) of the disruptive signal per PRB. In some other embodiments, the terminal device 120-1 may obtain a transmission pattern of the disruptive signal. In other words, the PRB usage over time can be obtained by the terminal device 120-1. The set of third devices may also perform directional measurements of the problematic spectrum. In this case, the set of third devices may report such measurements in the global coordinate system (i.e. by removing the orientation effects).

In some embodiments, the terminal device 120-1 may measure 3035 the reference signal which is considered to be clean. For example, the terminal device 120-1 may measure the PRS or SRS based on the second configuration indicated in the measurement configuration. The terminal device 120-1 may perform a positioning measurement on the reference signal based on the second configuration. For example, the terminal device 120-1 may determine the reference signal received power (RSRP) of the reference signal. Alternatively, time of arrival of the reference signal may be obtained. The terminal device 120-1 may determine arrival of angle of the reference signal. In this way, the terminal device 120-1 helps to ensure that the set of third devices can be trusted, thereby guaranteeing the integrity of the positioning session.

The terminal device 120-1 transmits 3040 information relating to the source to the terminal device 120-3. The terminal device 120-3 may forward 3041 the information to the first device 110. For example, as mentioned above, the measurement configuration may indicate which metric(s) should be reported. In some embodiments, the information may indicate the total received power per PRB. Alternatively or in addition, the information may indicate the SNR or SINR the disruptive signal per PRB. The information may also indicate the transmission pattern of the disruptive signal. In this way, the source of the anomaly behavior can be detected and localized based on the information. Moreover, the integrity of the positioning session can be preserved.

As mentioned above, the terminal device 120-1 may measure the reference signal which is considered to be clean. In this case, the information transmitted to the terminal device 120-3 and the first device 110 may comprise the positioning measurement results of the reference signal. For example, the information may comprise one or any combinations of: the RSRP of the reference signal, the TOA of the reference signal or the AOA of the reference signal. Other reference signals may also be selected for measurements. The first device 110 may consider the measurement results of the reference signal as a trusted measurement of the set of third devices. For example, if the clean reference signal is measured very accurately, the first device 110 may conclude that the PRU properties (e.g. measurement receiver, GNSS position reports) are precise enough and that it can also trust the rest of the measurements.

In some embodiments, the set of third device (for example, the terminal device 120-1) may know its location. In this case, the terminal device 120-1 may perform the anomaly detection periodically. If the anomaly behavior occurs, the terminal device 120-1 can report such event without an explicit trigger from the first device 110.

The first device 110 may identify 3045 a fourth device as the source based on the received information. The first device 110 may collect the information from the set of third devices and combine the collected information. The source/fourth device can be localized based on the collected information. In some embodiments, the first device 110 may determine weight values of the set of third devices based on the information. The first device 110 may combine weighted locations of the set of third devices. The location of the source/fourth device can be determined based on the combined weighted locations. The first device 110 may determine the location of the source based on a hierarchical approach. For example, the first device 110 may rank the trustworthiness of the set of third devises based on the measurement results concerning the clean reference signal. The first device 110 may combine the location of the set of third devices in a weighted manner. For example, the first device 110 may combine the location of the set of third devices based on weighted centroid localization. Alternatively, the location of the set of third devices may be combined based on double circle localization.

The first device 110 may update 3050 the measurement configuration based on the information. For example, the set of PRBs needed to be measured by the set of third devices can be updated based on the information. Alternatively or in addition, the attack strategy of the source may be updated based on the information. In other embodiments, the first configuration of the reference signal may be updated based on the information.

It should be noted that embodiments described above can be implemented separately. Alternatively, embodiments described above can be implemented together.

Figure 5:
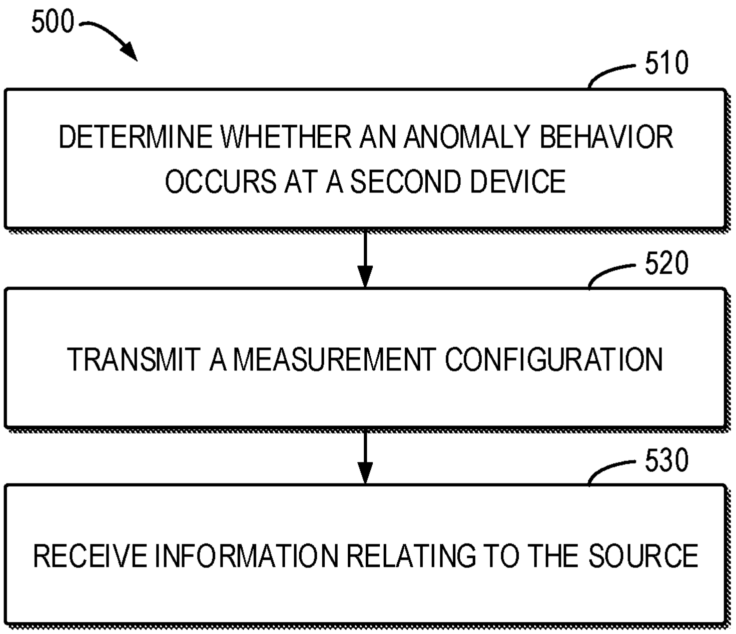
FIG. 5 illustrates a flow chart of a method according to some embodiments of the present disclosure.

FIG. 5 illustrates a flow chart of method 500 according to embodiments of the present disclosure. The method 500 can be implemented at any suitable device. For example, the method may be implemented at the first device 110.

In some embodiments, the first device 110 may receive a location request for a second device from the fifth device. In some embodiments, the second device may be a terminal device. For example, the second device can be any one of terminal devices 120.

At block 510, the first device 110 determines whether an anomaly behavior occurs at the second device. In some embodiments, the first device 110 may compute a likelihood that the positioning integrity of the second device has been compromised. The first device 110 may collect data from the latest positioning sessions of the second device and information about traffic of the second device in the serving cell from the serving network device of the second device. In this case, the first device 110 may determine whether an anomaly behavior occurs at the second device based on information received from a serving network device of the second device. This information can be transmitted to the first device 110 upon a request from the first device 110. Alternatively, the information can be transmitted to the first device 110 periodically. In this case, in some embodiments, the first device 110 may perform the anomaly detection based on a target position accuracy or precision of the second device. For example, if the position accuracy of the second device is below the target position accuracy, the anomaly at the second device is detected. In other embodiments, the first device 110 may perform the anomaly detection based on CSI of the second device. For example, if the channel state information changes dramatically, the first device 110 may determine that the anomaly at the second device is detected. Alternatively or in addition, the first device 110 may perform the anomaly detection based on a mobility profile of the second device. For example, the first device 110 may analyze a handover history and rate of the second device.

Alternatively, the first device 110 may determine whether an anomaly behavior occurs at the second device based on an indication regarding the anomaly behavior from the serving network device of the second device. In this case, the serving network device may perform the anomaly detection. For example, the serving network device may perform the anomaly detection based on the information about traffic of the second device. The serving network device may transmit the indication via backhaul (for example, via NR positioning protocol A (NRPPa) interface). In some embodiments, the indication may be a binary flag. For example, if the anomaly is detected, the binary flag may be "1."

In some embodiments, if the anomaly behavior for the second device is detected, the first device 110 can trigger a detection strategy with the purpose of localizing a source which causes the anomaly behavior. For example, the first device 110 may select a set of third devices as positioning reference units (PRUs). The first device 110 may select the set of third devices based on a previous location of the second device and an approximate current location of the second device. In some embodiments, the previous location can be the latest reliable location of the second device. The first device 110 may select one or more devices that are close to the second device as the set of third devices. For example, the first device 110 may determine a distance between a device and the second device based on the previous location and the approximate current location of the second device. If the distance is below a threshold, said device can be selected as one of the set of third devices.

In some embodiments, the set of third devices may comprise one or more terminal devices. Alternatively, the set of third devices may comprise a network device, for example, the network device 130. In some embodiments, the first device 110 may designate a terminal device (for example, the terminal device 120-3) as a relay. For example, if the disruptive signal level is too high in the UL bandwidth of the set of third devices and/or the serving network device cannot receive information, the first device 110 may determine a relay. In this case, the terminal device 120-3 may act as a uni-directional relay or a bi-directional relay of both measurement configuration and the measurement report in case both the DL and UL are severely affected. Alternatively, the terminal device 120-3 may act as a uni-directional relay or a bi-directional relay for the UL or DL.

At block 520, the first device 110 transmits a measurement configuration for detecting the source of the anomaly behavior. In some embodiments, the measurement configuration may be transmitted to the terminal device 120-1 directly. Alternatively, the measurement configuration may be transmitted to the terminal device 120-3 and forwarded to the terminal device 120-1 by the terminal device 120-3. In this case, the first device 110 may be configured to measure a disruptive signal for a limited time, specific bandwidth portions, and carriers. The measurement configuration can be transmitted in a LPP message. In some embodiments, the measurement configuration can be transmitted periodically. Alternatively or in addition, the measurement configuration can be transmitted on demand.

In some embodiments, the measurement configuration may comprise a spectrum portion to be measured by the set of third devices. For example, the measurement configuration may comprise a set of PRBs. The source (i.e., the fraudulent or malicious device) can transmit a set of disruptive signals on this set of PRBs. The term "disruptive signal" used herein can refer to a signal which is transmitted by a fraudulent or malicious device and may disturb the positioning of the target device.

Alternatively or in addition, the measurement configuration can comprise an attack strategy of the source. For example, in some embodiments, the measurement configuration may indicate that the source may be flooding the set of PRBs at once. Alternatively or in addition, the measurement configuration may indicate that subsets of the set of PRBs can be flooded in a random fashion.

In other embodiments, the measurement configuration may comprise a first configuration of a reference signal which is blocked by the disruptive signal from the source. In some embodiments, the reference signal may be a positioning reference signal (PRS). Alternatively or in addition, the reference signal may be a sounding reference signal (SRS). The set of third devices may subtract the useful signal from its received signal and isolate the disruptive signal based on the first configuration.

Alternatively or in addition, the measurement configuration may comprise a second configuration of a reference signal which is not blocked by the disruptive signal from the source. In other words, the measurement configuration may comprise a PRS or SRS configuration that the first device 110 considers to be clean.

In some embodiments, the measurement configuration may indicate a time window for detecting the disruptive signal from the source. For example, the time window can be aligned with a measurement gap of the set of third devices. Alternatively, the first device 110 may determine the time window based on the transmission pattern of the disruptive signal. The first device 110 may also transmit information regarding the time window to the serving network device, for example, the network device 130. In this case, the network device 130 may not schedule data for the set of third devices.

The measurement configuration may also indicate which metric(s) the set of third devices should report back. Alternatively or in addition, the measurement configuration may indicate which interface the set of third devices should use to report the metrics. For example, the measurement configuration may indicate that the set of third devices may report the metrics via LPP signaling. Alternatively, the measurement configuration may indicate that the metrics can be reported via radio resource control (RRC) signaling. In some other embodiments, the measurement configuration may indicate that the metrics can be reported via a sidelink (SL) relay.

At block 530, the first device 110 receives information relating to the source. In some embodiments, the first device 110 may receive the information from the terminal device 120-1 directly. Alternatively, the information may be forwarded by the terminal device 120-3.

For example, as mentioned above, the measurement configuration may indicate which metric(s) should be reported. In some embodiments, the information may indicate the total received power per PRB. Alternatively or in addition, the information may indicate the SNR or SINR the disruptive signal per PRB. The information may also indicate the transmission pattern of the disruptive signal.

As mentioned above, the terminal device 120-1 may measure the reference signal which is considered to be clean. In this case, the information may comprise the positioning measurement results of the reference signal. For example, the information may comprise one or any combination of: the RSRP of the reference signal, the TOA of the reference signal or the AOA of the reference signal. Other reference signals may also be selected for measurements. The first device 110 may consider the measurement results of the reference signal as a trust measurement of the set of third devices. For example, if the clean reference signal is measured very accurately, the first device 110 may conclude that the PRU properties (e.g. measurement receiver, GNSS position reports) are precise enough and that it can also trust the rest of the measurements.

The first device 110 may identify a fourth device as the source based on the received information. The first device 110 may collect the information from the set of third devices and combine the collected information. The source/fourth device can be localized based on the collected information.

In some embodiments, the first device 110 may determine weight values of the set of third devices based on the information. The first device 110 may combine weighted locations of the set of third devices. The location of the source/fourth device can be determined based on the combined weighted locations. The first device 110 may determine the location of the source based on a hierarchical approach. For example, the first device 110 may rank the trustworthiness of the set of third devises based on the measurement results concerning the clean reference signal. The first device 110 may combine the location of the set of third devices in a weighted manner. For example, the first device 110 may combine the location of the set of third devices based on weighted centroid localization. Alternatively, the location of the set of third devices may be combined based on double circle localization.

In some embodiments, the first device 110 may update the measurement configuration based on the information. For example, the set of PRBs needed to be measured by the set of third devices can be updated based on the information. Alternatively or in addition, the attack strategy of the source may be updated based on the information. In other embodiments, the first configuration of the reference signal may be updated based on the information.

The first device 110 may inform the fifth device (i.e., the LCS client 210) the location of the source. In some embodiments, the first device 110 may also inform the fifth device that the anomaly behavior is detected.

Figure 6:
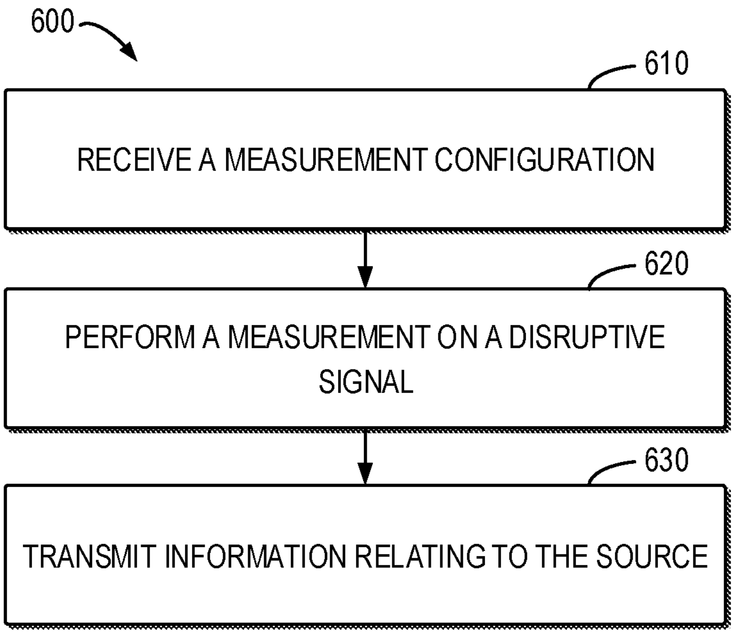
FIG. 6 illustrates a flow chart of a method according to other embodiments of the present disclosure.

FIG. 6 illustrates a flow chart of method 600 according to embodiments of the present disclosure. The method 600 can be implemented at any suitable device. For example, the method may be implemented at the terminal device 120-1.

At block 610, the terminal device 120-1 receives a measurement configuration for detecting the source of the anomaly behavior. In some embodiments, the terminal device 120-1 may receive the measurement configuration from the first device 110 directly. Alternatively, the terminal device 120-1 may receive the measurement configuration from the terminal device 120-3 which acts as a relay between the terminal device 120-1 and the first device 110. In this case, the first device 110 may be configured to measure a disruptive signal for a limited time, specific bandwidth portions, and carriers. The measurement configuration can be transmitted in a LTE positioning protocol (LPP) message. In some embodiments, the measurement configuration can be transmitted periodically. Alternatively or in addition, the measurement configuration can be transmitted on demand.

In some embodiments, the measurement configuration may comprise a spectrum portion to be measured by the set of third devices. For example, the measurement configuration may comprise a set of PRBs. The source (i.e., the fraudulent device) can transmit a set of disruptive signals on this set of PRBs. The term "disruptive signal" used herein can refer to a signal which is transmitted by fraudulent device and may disturb the positioning of the target device.

Alternatively or in addition, the measurement configuration can comprise information relating to an attack strategy of the source. For example, in some embodiments, the measurement configuration may indicate that the source may be flooding the set of PRBs at once. Alternatively or in addition, the measurement configuration may indicate that subsets of the set of PRBs can be flooded in a random fashion.

In other embodiments, the measurement configuration may comprise a first configuration of a reference signal which is blocked by the disruptive signal from the source. In some embodiments, the reference signal may be a positioning reference signal (PRS). Alternatively or in addition, the reference signal may be a sounding reference signal (SRS). The set of third device may subtract the useful signal from its received signal and isolate the disruptive signal based on the first configuration.

Alternatively or in addition, the measurement configuration may comprise a second configuration of a reference signal which is not blocked by the disruptive signal from the source. In other words, the measurement configuration may comprise a PRS or SRS configuration that the first device 110 considers to be clean.

In some embodiments, the measurement configuration may indicate a time window for detecting the disruptive signal from the source. For example, the time window can be aligned with a measurement gap of the set of third devices.

The measurement configuration may also indicate which metric(s) the set of third devices should report back. Alternatively or in addition, the measurement configuration may indicate which interface the set of third devices should use to report the metrics. For example, the measurement configuration may indicate that the set of third devices may report the metrics via LPP signaling. Alternatively, the measurement configuration may indicate that the metrics can be reported via radio resource control (RRC) signaling. In some other embodiments, the measurement configuration may indicate that the metrics can be reported via a sidelink (SL) relay.

At block 620, the terminal device 120-1 measures the disruptive signal based on the measurement configuration. The terminal device 120-1 may measure the disruptive signal during the time window indicated in the measurement configuration. The terminal device 120-1 may subtract a reference signal from the disruptive signal based on the first configuration indicated in the measurement configuration. In some embodiments, the terminal device 120-1 may obtain a total received power of the disruptive signal per PRB. Alternatively or in addition, the terminal device 120-1 may obtain a signal to noise ratio (SNR) or a signal to interference and noise ratio (SINR) of the disruptive signal per PRB. In some other embodiments, the terminal device 120-1 may obtain a transmission pattern of the disruptive signal. In other word, the PRB usage over time can be obtained by the terminal device 120-1. The set of third devices may also perform directional measurements of the problematic spectrum. In this case, the set of third devices may report such measurements in the global coordinate system (i.e. by removing the orientation effects).

In some embodiments, the terminal device 120-1 may measure the reference signal which is considered to be clean. For example, the terminal device 120-1 may measure the PRS or SRS based on the second configuration indicated in the measurement configuration. The terminal device 120-1 may perform a positioning measurement on the reference signal based on the second configuration. For example, the terminal device 120-1 may determine the reference signal received power (RSRP) of the reference signal. Alternatively, time of arrival of the reference signal may be obtained. The terminal device 120-1 may determine arrival of angle of the reference signal.

At block 630, the terminal device 120-1 transmits information relating to the source. In some embodiments, the terminal device 120-1 may transmit the information to the first device 110 directly. Alternatively, the terminal device 120-1 may transmit the information to the terminal device

120-3 and the information may be forwarded to the first device 110 by the terminal device 120-3.

For example, as mentioned above, the measurement configuration may indicate which metric(s) should be reported. In some embodiments, the information may indicate the total received power per PRB. Alternatively or in addition, the information may indicate the SNR or SINR the disruptive signal per PRB. The information may also indicate the transmission pattern of the disruptive signal.

As mentioned above, the terminal device 120-1 may measure the reference signal which is considered to be clean. In this case, the information may comprise the positioning measurement results of the reference signal. For example, the information may comprise one or any combination of: the RSRP of the reference signal, the TOA of the reference signal or the AOA of the reference signal. Other reference signals may also be selected for measurements. The first device 110 may consider the measurement results of the reference signal as a trusted measurement of the set of third devices. For example, if the clean reference signal is measured very accurately, the first device 110 may conclude that the PRU properties (e.g. measurement receiver, GNSS position reports) are precise enough and that it can also trust the rest of the measurements.

In some embodiments, the set of third devices (for example, the terminal device 120-1) may know its location. In this case, the terminal device 120-1 may perform the anomaly detection periodically. If the anomaly behavior occurs, the terminal device 120-1 can report such event without an explicit trigger from the first device 110.

In some embodiments, an apparatus for performing the method 500 (for example, the first device 110) may comprise respective means for performing the corresponding steps in the method 500. These means may be implemented in any suitable manner. For example, it can be implemented by circuitry or software modules.

In some embodiments, the apparatus comprises means for determining whether an anomaly behavior occurs at a second device; means for in accordance with a determination that the anomaly behavior is detected at the second device, transmitting, to a set of third devices, a measurement configuration for detecting a source of the anomaly behavior; and means for receiving, from the set of third devices, information relating to the source.

In some embodiments, the means for determining whether the anomaly behavior occurs at the second device comprises: means for determining whether the anomaly behavior occurs at the second device based on at least one of: a target position accuracy of the second device, channel state information of the second device, a mobility profile of the second device, or an indication regarding the anomaly behavior received from a network device serving the second device.

In some embodiments, the apparatus comprises means for selecting the set of third devices based on a previous location of the second device and an approximate current location of the second device.

In some embodiments, the measurement configuration comprises at least one of: a spectrum portion to be measured, an attack strategy of the source, a first configuration of reference signals that are blocked by a disruptive signal from the source, a second configuration of reference signals that are not blocked by the disruptive signal from the source, or a time window for detecting the disruptive signal from the source.

In some embodiments, the information comprises at least one of: a received power of a disruptive signal per physical resource block, a signal to noise ratio of the disruptive signal per physical resource block, a transmission pattern of the disruptive signal from the source, or a result of a positioning measurement on a reference signal that is not blocked by the disruptive signal from the source.

In some embodiments, the apparatus comprises means for identifying a fourth device as the source. The means for identifying the fourth device comprises: means for determining weight values of the set of third devices based on the information; means for combining weighted locations of the set of third devices; and means for determining a location of the fourth device based on the combined weighted locations.

In some embodiments, the apparatus comprises means for updating the measurement configuration based on the information.

In some embodiments, the apparatus comprises means for informing a fifth device location information of the source.

In some embodiments, the means for receiving the information relating to the source comprises: means for receiving the information relating to the source directly from the set of third devices; or means for receiving the information relating to the source from a relay device between the first device and the set of third devices.

In some embodiments, the first device is a location management function (LMF), the second device is a terminal device, the set of third devices comprises a set of positioning reference units (PRUs), or the first device is a location management function (LMF), the second device is a terminal device, the set of third devices comprises a set of sidelink terminal devices; and the source is a disruptive device distorting a positioning signal of the second device.

In some embodiments, an apparatus for performing the method 600 (for example, the terminal device 120) may comprise respective means for performing the corresponding steps in the method 600. These means may be implemented in any suitable manners. For example, it can be implemented by circuitry or software modules.

In some embodiments, the apparatus comprises means for receiving, from a first device, a measurement configuration for detecting a source causing an anomaly behavior at a second device; means for performing a measurement on a disruptive signal from the source based on the measurement configuration; and means for transmitting, to the first device, information relating to the source.

In some embodiments, the measurement configuration comprises at least one of: a set of physical resource blocks to be measured, an attack strategy of the source, a first configuration of reference signals that are blocked by a disruptive signal from the source, or a time window for detecting the disruptive signal from the source.

In some embodiments, the means for performing the measurement on the disruptive signal comprises: means for measuring the disruptive signal on the set of physical resource blocks during the time window; and means for subtracting a reference signal from the disruptive signal based on the first configuration.

In some embodiments, the information comprises at least one of: a received power of the disruptive signal per physical resource block, a signal to noise ratio of the disruptive signals per physical resource block, or a transmission pattern of the disruptive signal.

In some embodiments, the measurement configuration further comprises a second configuration of reference signals that are not blocked by the disruptive signal. In some embodiments, the apparatus comprises means for performing a positioning measurement on a reference signal based on the second configuration. In some embodiments, the metrics further comprises a result of the positioning measurement.

In some embodiments, the first device is a location management function (LMF) or a sidelink terminal device, the second device is a terminal device, the third device comprises a positioning reference unit, and the source is a disruptive device distorting a positioning signal of the second device.

Figure 7:
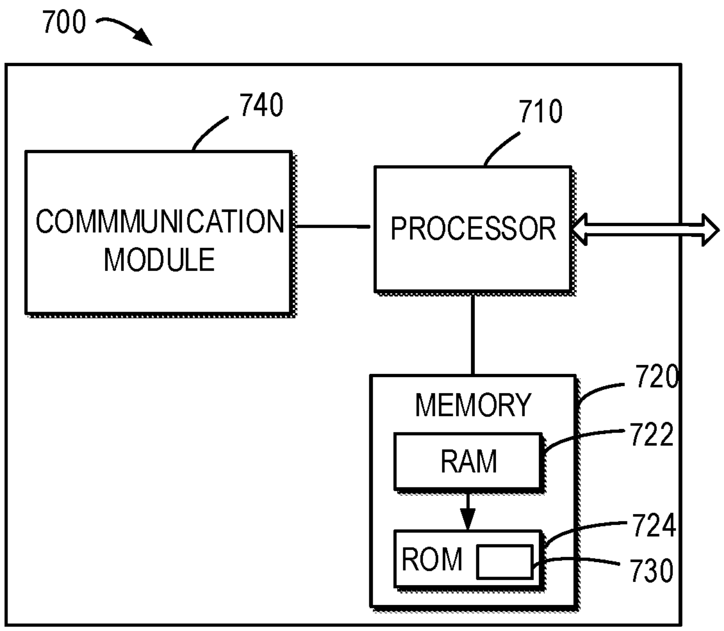
FIG. 7 illustrates a simplified block diagram of an apparatus that is suitable for implementing embodiments of the present disclosure.

FIG. 7 is a simplified block diagram of a device 700 that is suitable for implementing embodiments of the present disclosure. The device 700 may be provided to implement the communication device, for example, first device 110, the terminal device 120, or the network device 130 as shown in FIG. 1. As shown, the device 700 includes one or more processors 710, one or more memories 720 coupled to the processor 710, and one or more communication modules 740 coupled to the processor 710.

The communication module 740 is for bidirectional communications. The communication module 740 has at least one antenna to facilitate communication. The communication interface may represent any interface that is necessary for communication with other network elements.

The processor 710 may be of any type suitable to the local technical network and may include one or more of the following: general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

The memory 720 may include one or more non-volatile memories and one or more volatile memories. Examples of the non-volatile memories include, but are not limited to, a Read Only Memory (ROM) 724, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 722 and other volatile memories that will not last in the power-down duration.

A computer program 730 includes computer executable instructions that are executed by the associated processor 710. The program 730 may be stored in the ROM 724. The processor 710 may perform any suitable actions and processing by loading the program 730 into the RAM 722.

The embodiments of the present disclosure may be implemented by means of the program 720 so that the device 700 may perform any process of the disclosure as discussed with reference to FIGS. 2 and 6. The embodiments of the present disclosure may also be implemented by hardware or by a combination of software and hardware.

Figure 8:
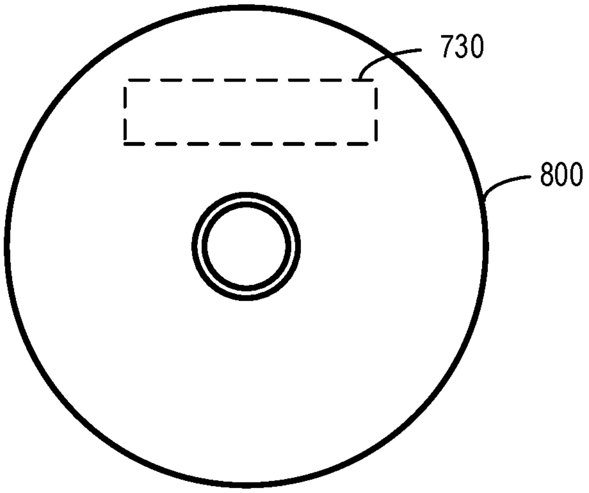
FIG. 8 illustrates a block diagram of an example computer readable medium in accordance with some example embodiments of the present disclosure.

In some example embodiments, the program 730 may be tangibly contained in a computer readable medium which may be included in the device 700 (such as in the memory 720) or other storage devices that are accessible by the device 700. The device 700 may load the program 730 from the computer readable medium to the RAM 722 for execution. The computer readable medium may include any types of tangible non-volatile storage, such as ROM, EPROM, a flash memory, a hard disk, CD, DVD, and the like. FIG. 8 shows an example of the computer readable medium 800 in form of CD or DVD. The computer readable medium has the program 730 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods as described above with reference to FIGS. 2-6. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device comprising:
at least one processor; and
at least one memory including computer program codes;
the at least one memory and the computer program codes are configured to, with the at least one processor, cause the first device to:
determine whether an anomaly behavior occurs at a second device;
in accordance with a determination that the anomaly behavior is detected at the second device, transmit, to a set of third devices, a measurement configuration for detecting a source of the anomaly behavior; and
receive information relating to the source from the set of third devices.

2. The first device of claim 1, wherein the at least one memory and the computer program code are configured to, with the at least one processor, cause the first device to determine whether the anomaly behavior occurs at the second device by:
determining whether the anomaly behavior occurs at the second device based on at least one of:
a target position accuracy of the second device,
channel state information of the second device,
a mobility profile of the second device, or
an indication regarding the anomaly behavior received from a network device serving the second device.

3. The first device of claim 1, wherein the at least one memory and the computer program code are configured to, with the at least one processor, cause the first device to:
select the set of third devices based on a previous location of the second device and an approximate current location of the second device.

4. The first device of claim 1, wherein the measurement configuration comprises at least one of:
a spectrum portion to be measured,
an attack strategy of the source,
a first configuration of reference signals that are blocked by a disruptive signal from the source,
a second configuration of reference signals that are not blocked by the disruptive signal from the source, or
a time window for detecting the disruptive signal from the source.

5. The first device of claim 1, wherein information comprises at least one of:
a received power of a disruptive signal per physical resource block,
a signal to noise ratio of the disruptive signal per physical resource block,
a transmission pattern of the disruptive signal from the source, or
a result of a positioning measurement on a reference signal that is not blocked by the disruptive signal from the source.

6. The first device of claim 1, wherein the at least one memory and the computer program code are configured to, with the at least one processor, further cause the first device to identify a fourth device as the source by:
determining weight values of the set of third devices based on the information;
combining weighted locations of the set of third devices; and
determining a location of the fourth device based on the combined weighted locations.

7. The first device of claim 1, wherein the at least one memory and the computer program code are configured to, with the at least one processor, further cause the first device to:
update the measurement configuration based on the information.

8. The first device of claim 1, wherein the at least one memory and the computer program code are configured to, with the at least one processor, further cause the first device to:
inform a fifth device location information of the source.

9. The first device of claim 1, wherein the at least one memory and the computer program code are configured to, with the at least one processor, cause the first device to receive the information relating to the source by:
receiving the information relating to the source directly from the set of third devices; or
receiving the information relating to the source from a relay device between the first device and the set of third devices.

10. The first device of claim 1, wherein the first device is a location management function (LMF), the second device is a terminal device, the set of third devices comprises a set of positioning reference units (PRUs), or
wherein the first device is a location management function (LMF), the second device is a terminal device, the set of third devices comprises a set of sidelink terminal devices; and
wherein the source is a disruptive device distorting a positioning signal of the second device.

11. A third device comprising:
at least one processor; and
at least one memory including computer program codes;
the at least one memory and the computer program codes are configured to, with the at least one processor, cause the third device to:
receive, from a first device, a measurement configuration for detecting a source causing an anomaly behavior at a second device;
perform a measurement on a disruptive signal from the source based on the measurement configuration; and
transmit, to the first device, information relating to the source.

12. The third device of claim 11, wherein the measurement configuration comprises at least one of:
a spectrum portion to be measured,
an attack strategy of the source,
a first configuration of reference signals that are blocked by a disruptive signal from the source, or a time window for detecting the disruptive signal from the source.

13. The third device of claim 12, wherein the at least one memory and the computer program code are configured to, with the at least one processor, cause the third device to perform the measurement on the disruptive signal by:

measuring the disruptive signal on the set of physical resource blocks during the time window; and subtracting a reference signal from the disruptive signal based on the first configuration.

14. The third device of claim 11, wherein the information comprises at least one of:

a received power of the disruptive signal per physical resource block, a signal to noise ratio of the disruptive signals per physical resource block, or a transmission pattern of the disruptive signal.

15. The third device of claim 14, wherein the measurement configuration further comprises a second configuration of reference signals that are not blocked by the disruptive signal, and wherein the at least one memory and the computer program code are configured to, with the at least one processor, further cause the third device to:

perform a positioning measurement on a reference signal based on the second configuration; and wherein the metrics further comprises a result of the positioning measurement.

16. The third device of claim 11, wherein the first device is a location management function (LMF) or a sidelink terminal device, the second device is a terminal device, the third device comprises a positioning reference unit, and the source is a disruptive device distorting a positioning signal of the second device.

17. A method, comprising:

determining, at a first device, whether an anomaly behavior occurs at a second device;

in accordance with a determination that the anomaly behavior is detected at the second device, transmitting, to a set of third devices, a measurement configuration for detecting a source of the anomaly behavior; and receiving, from the set of third devices, information relating to the source.

18. The method of claim 17, wherein determining whether the anomaly behavior occurs at the second device comprises:

determining whether the anomaly behavior occurs at the second device based on at least one of:

a target position accuracy of the second device, channel state information of the second device, a mobility profile of the second device, or an indication regarding the anomaly behavior received from a network device serving the second device.

19. The method of claim 17, further comprising:

selecting the set of third devices based on a previous location of the second device and an approximate current location of the second device.

20. The method of claim 17, wherein the measurement configuration comprises at least one of:

a set of physical resource blocks to be measured, an attack strategy of the source, a first configuration of reference signals that are blocked by a disruptive signal from the source, a second configuration of reference signals that are not blocked by the disruptive signal from the source, or a time window for detecting the disruptive signal from the source.

* * * * *